United States Patent [19]

Moore et al.

[11] Patent Number: 5,666,906
[45] Date of Patent: Sep. 16, 1997

[54] ANIMAL DUSTING BAG

[76] Inventors: Gilbert A. Moore; Denilda S. Moore, both of 1917 SW. Hartley Ave., Gresham, Oreg. 97080

[21] Appl. No.: 523,499

[22] Filed: Sep. 1, 1995

[51] Int. Cl.[6] .................................................. A01K 13/00
[52] U.S. Cl. ........................................................ 119/672
[58] Field of Search ............................... 119/652, 661, 119/672

[56] References Cited

U.S. PATENT DOCUMENTS

| | | |
|---|---|---|
| 2,814,273 | 11/1957 | Dickens . |
| 2,991,785 | 7/1961 | Ekren . |
| 3,033,166 | 5/1962 | Murry . |
| 3,364,900 | 1/1968 | Knapp .................................. 119/661 |
| 3,563,209 | 2/1971 | Mommer ............................. 119/661 |
| 3,677,233 | 7/1972 | White, Jr. ............................ 119/661 |
| 3,696,472 | 10/1972 | Perina ................................. 24/406 |
| 3,777,716 | 12/1973 | Cortner ............................... 119/656 |
| 3,821,940 | 7/1974 | Mann ................................... 119/657 |
| 3,826,296 | 7/1974 | Morris ................................. 383/95 |
| 3,847,122 | 11/1974 | Gould .................................. 119/661 |
| 3,901,195 | 8/1975 | Stewart ............................... 119/662 |
| 3,902,461 | 9/1975 | Cortner ............................... 119/661 |
| 3,971,342 | 7/1976 | Cortner ............................... 119/661 |
| 3,972,309 | 8/1976 | Cortner ............................... 119/661 |
| 4,074,659 | 2/1978 | Mowbray ............................ 119/662 |
| 4,079,700 | 3/1978 | Eshnaur .............................. 119/678 |
| 4,130,092 | 12/1978 | Eshnaur .............................. 119/677 |
| 4,258,667 | 3/1981 | Eshnaur .............................. 119/677 |

*Primary Examiner*—Robert P. Swiatek
*Assistant Examiner*—Elizabeth Shaw
*Attorney, Agent, or Firm*—Marger, Johnson, McCollom & Stolowitz, P.C.

[57] ABSTRACT

A top-loaded dusting bag for dispensing powdered insecticide upon contact with the bag. The bag includes an inner porous sack made of burlap or other loose weave material and an outer skirt made of a non-porous material which covers the top and sides of the inner bag and extends below the bottom of the inner bag, leaving the bottom of the inner bag exposed only from underneath. In a first embodiment, a rigid support member secured to one side of the opening and a cantilevered U-shaped member secured to an opposing side of the opening form an assembly which in a first position exposes and separates the opening sides to form a funnel and in a second position, wherein the U-shaped member is rotated around the support member, folds the opposing side over the one side of the opening to close the opening. In a second embodiment, an opening is defined along three edges of the top of the bag forming a flap which may be folded down revealing the opening to the inner bag or folded upward and secured to the opposing side with a hook and loop fastener material.

19 Claims, 2 Drawing Sheets

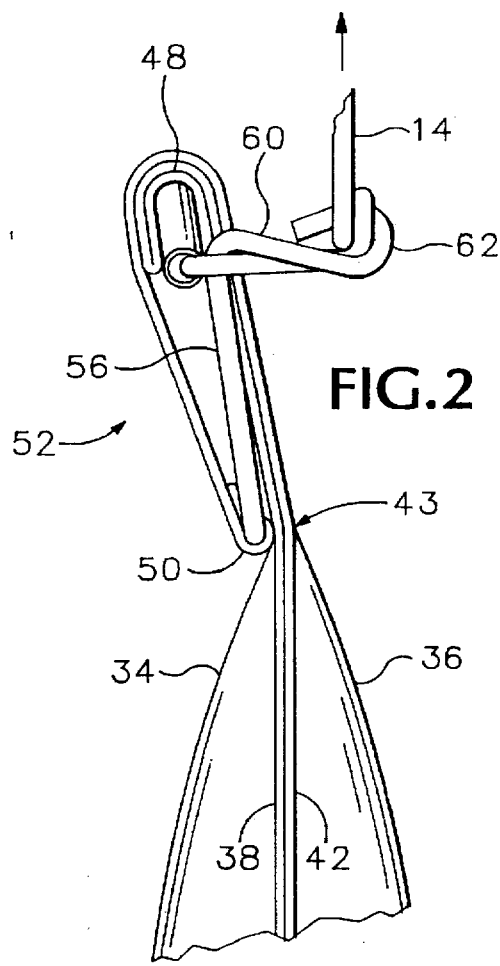
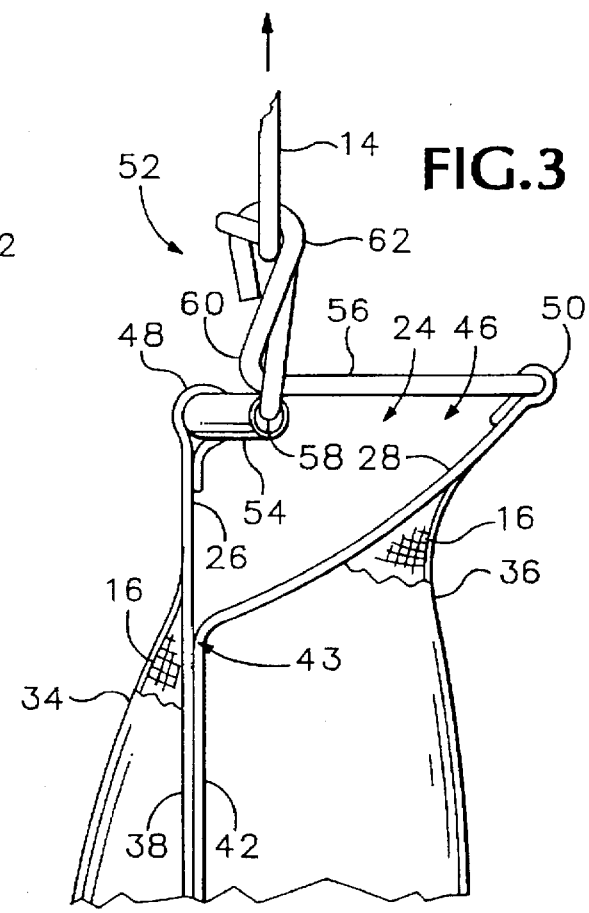
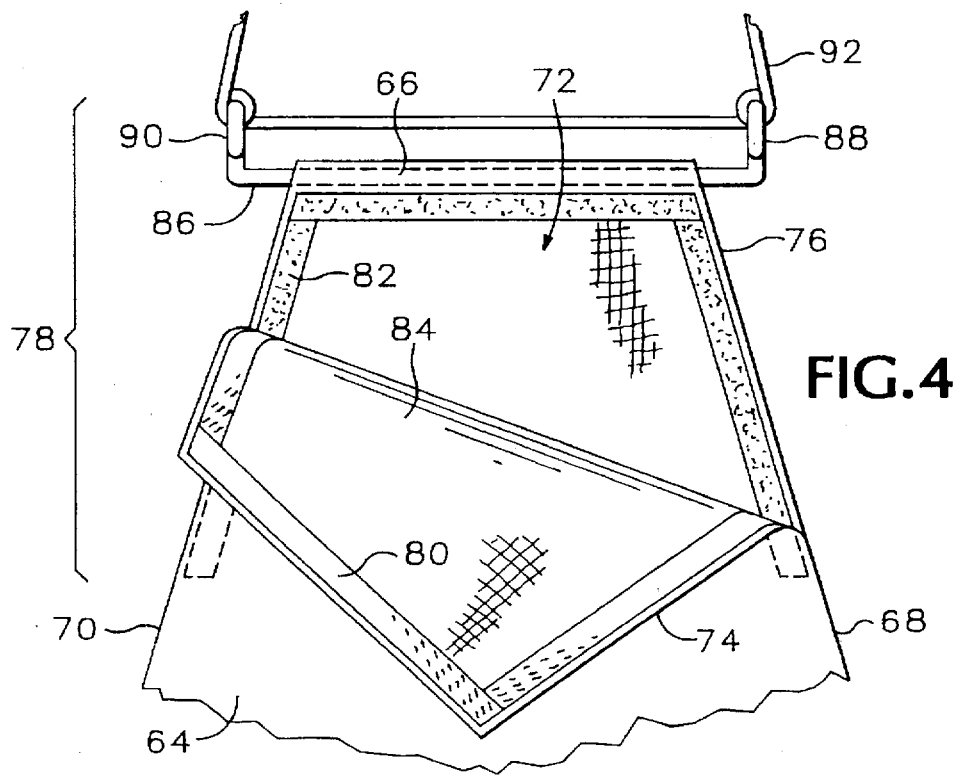

ANIMAL DUSTING BAG

BACKGROUND OF THE INVENTION

This invention relates generally to insecticide applicators for animals and more particularly to dusting bags having a novel closure structure so as to simplify the process of filling the bag with insecticide powder.

It is well known that certain types of insects such as flies, ticks and lice can prey upon animals, often resulting in weight loss, damaged hides or even death to the animal. To combat this problem, ranchers have applied conventional off-based or powder insecticides to their animals. Application of the insecticide, though, has posed a logistical as well as financial problem.

One method of applying insecticide to animals which has gained wide acceptance within the ranching community is the use of dusting bags. In the past, dusting bags were simply burlap sacks which were filled with an insecticide powder and suspended from low hanging tree limbs. Cattle or other animals would brush up against the bag and disturb the contents therein, thus causing the insecticide powder to sift through the loose burlap weave and fall onto the back of the animal. Because these bags were open topped, it was a simple matter to fill the bags with insecticide by simply pouring the powder into the open top. However, the open top let water seep into the bag during rain storms thus causing the powder to clump together. These early dusting bags suffered from an additional disadvantage in that the bag was often destroyed by chewing animals or clogged with dirt and saliva from direct contact with the animals.

Later dusting bags, such as those disclosed in U.S. Pat. Nos. 3,972,309 to Cortner, Jr. and 4,130,092 and 4,258,667 to Eshnaur et al. incorporate an outer water tight cover draped over the top and sides of the burlap sack. The covering was effective to keep the animals from direct contact with the inner burlap sack. Cortner, Jr. and Eshnaur et al. have vertical slits through the outer covering and inner sack which allow filling of the bag with insecticide powder and which reduce the chance of the bag opening inadvertently due to the weight of the insecticide. Other dusting bags being sold on the market were triangular or trapezoidal shaped having a velcro opening defined along one diagonal side edge of the bag. Still, filling of these bags with insecticide powder is relatively awkward and inefficient compared to older top-filled bags.

Eshnaur '092, in particular, discloses a dusting bag with a flip open top formed using a U-shaped member attached to the rear panel of the bag. Rope, woven into the border of the front panel of the bag, extends through loops on the member and passes upward to act as tie ends which are used to hang the bag. There are several drawbacks with the flip top disclosed in Eshnaur '092 which makes it more difficult to fill the dusting bags in the field. First, the opening is not well supported on all sides, thus making the opening flimsy and prone to collapse. A second drawback is the narrowness of the opening when the member is flipped to an open position. The opening can be expanded only by using a free hand which makes filling the bag awkward and inefficient.

Accordingly, a need remains for a dusting bag which is easy to fill, yet maintains closure of the opening thus preventing water from seeping into the powder filled inner bag.

SUMMARY OF THE INVENTION

It is, therefore, an object of the invention to provide an improved opening and closure mechanism which allows one-handed top loading of powdered insecticide into an animal dusting bag.

Another object of the invention is to provide an improved opening which, when closed, maintains the inserted powder in a dry state yet allows proper dispersal of the powder when the bag is disturbed.

The animal dusting bag constructed according to the present invention includes an inner porous sack preferably made of burlap or other loose weave material and an outer skirt made of a non-porous, waterproof material which covers the top and sides of the inner bag and extends below the bottom of the inner bag, leaving the bottom of the inner bag exposed only from underneath. In a first embodiment, a rigid support member secured to one side of the opening and a cantilevered U-shaped member secured to an opposing side of the opening form an assembly which in an open position exposes and separates the opening sides to form a funnel leading to the inner bag. When the member is rotated to a closed position, wherein the U-shaped member rotates around the support member, the opposing side folds over the other side of the opening to close it. In a second embodiment, an opening is defined along three edges of the top of the bag forming a flap which may be folded down revealing the opening to the inner bag or folded upward and secured to the opposing side with hook and loop material.

The first embodiment, having a cantilevered opening, has an advantageously large opening funnel which prevents spillage during filling. When closed, the inner bag is kept dry by the outer waterproof skirt, a portion of which is folded over the opening when the closing mechanism is rotated to the closed position.

The advantage of the second embodiment lies in the combination of vertical and horizontal openings thereby creating a fold down flap for the dusting bag. When filled, prior bags exert a downward force which normally tends to deform the top single horizontal opening and detach the secured openings. The additional substantially vertical edges of the opening, which preferably lie parallel to the side edges of the outer skirt, are not affected by the downward force and maintain the horizontal top opening secured. Additionally, the multi-side opening is larger than a typical one side opening and allows for greater access to the inner bag for filing purposes.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 2 is a slightly enlarged partial side elevation view of the dusting bag of FIG. 1.

FIG. 3 is a view similar to FIG. 2 with the dusting bag shown in an opened position.

FIG. 4 is a partial front elevation view of a dusting bag constructed in accordance with an alternate embodiment of the invention shown in an opened position.

DETAILED DESCRIPTION

Figure 1:
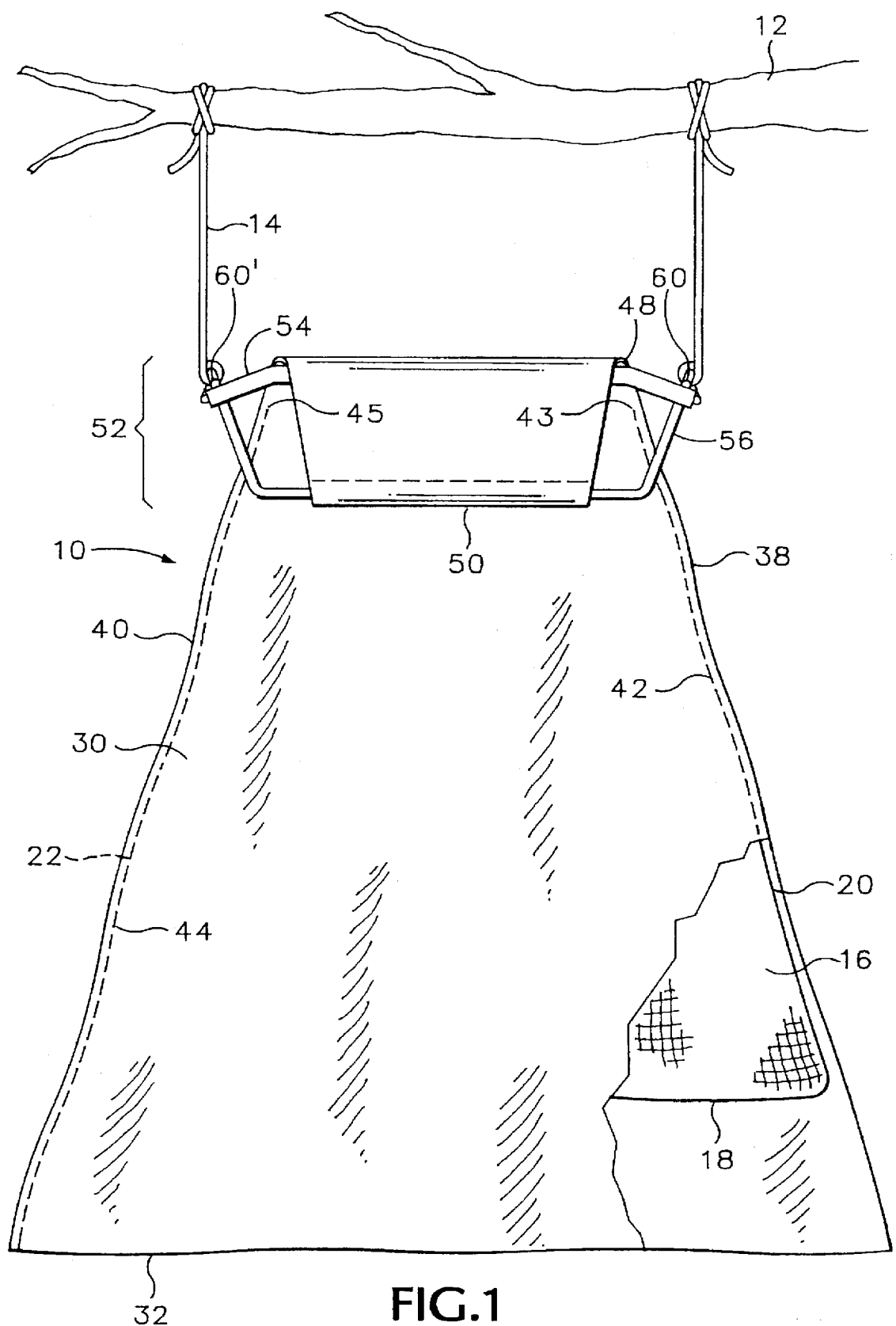
FIG. 1 is a cutaway front elevation view of a dusting bag incorporating the preferred embodiment of the invention suspended from a tree limb and shown in a closed position.

FIG. 1 shows the preferred embodiment of the dusting bag constructed according to the invention, shown generally at 10. Bag 10 is shown suspended from tree limb 12 by hanging means such as rope 14 and is shown in the closed position.

Bag 10 includes an inner dusting sack 16 for first storing and then dispensing the insecticide powder. Sack 16 has a closed lower end 18, side portions 20, 22, and an opening 24 which is defined by opposing front and back edges 26, 28 (shown best in FIG. 3). The inner dusting sack 16 is preferably made of a porous or loosely woven material, such as burlap, so that powder contained within the sack sifts through the openings at between the weave at the lower end 18 of the sack when the contents of sack 16 are disturbed.

A generally waterproof covering, shown as outer skirt 30, is secured to and substantially covers the outside of inner sack 16 to prevent rain and other foreign matter from seeping into the inner sack and thereby contaminating the contents of the sack or otherwise clogging the openings between the weave of the sack. The skirt 30 extends below the lower end 18 of sack 16 creating a lower opening 32 which exposes the lower end from below to facilitate passage of the powdered insecticide onto the backs of passing animals.

Skirt 30 is preferably made of a waterproofed material, such as ten ounce paraffin coated cotton duck cloth. The waterproof skirt includes substantially trapezoidal shaped front and back panels 34, 36 (best shown in FIGS. 2 and 3) which have left and right flared side walls 38, 40 extending outward and downward from the upper end of sack 16 to lower end 18. Front and back panels 34, 36 are secured together, such as along dashed stitch lines 42, 44, which run along a substantial length of the left and right flared side walls 38, 40 and terminate at locations 43, 45.

As shown best in combination with FIGS. 2 and 3, the front and back panels 34, 36 of skirt 30 are not stitched or otherwise secured to each other at the upper free portion of the skirt which runs from stitch terminal location 43 up to opposing edges 48, 50, thereby forming an upper opening 46 which is aligned with the inner sack opening 24. Stitch terminal location 43 (as well as location 45 situated along stitch line 44) is preferably two to eight inches below edges 48, 50, thereby allowing the upper opening 46 to assume a funnel-like shape (as shown in FIG. 3) for easier loading of the bag. Upper opening 46 is defined by opposing horizontal front and back edges 48, 50 which are secured adjacent the corresponding front and back opening edges 26, 28 of inner sack 16. As will be explained in more detail below, the alignment of upper skirt opening 46 with inner sack opening 24 allows top loading of insecticide powder or other material into the inner sack 16 for storage and dispersal.

Closure means, identified generally at 52 and further described below, is secured to the opposing edges 48, 50 of outer skirt 30. Closure means 52 includes an elongate rigid support member 54 secured to the front edge 48 of the outer skirt opening 46 and a U-shaped rigid member 56 secured to the back edge 50 of opening 46. U-shaped member 56 is preferably fixedly attached to both terminal ends of the support member 54, as by welding. The skirt 30 is preferably secured to members 54, 56 by stitching terminal portions of the skirt around the members as shown by the dashed stitch line in FIG. 1 and illustrated in FIGS. 2 and 3. As rigid members 54, 56 are secured along both the front and back edges 48, 50 unlike in prior art dusting bags, outer skirt opening 46 (and consequently inner sack opening 24) will not collapse or close as the inner sack 16 is being filled.

Support member 54 is preferably tubular, including an axial bore 58 (shown edge on in FIGS. 2 and 3) for passing a rope 14 therethrough. Further, member 54 can be bent in the plane of the U-shaped member 56 to yield an increased width to openings 24, 46. Preferably, this bend occurs in the portion of member 54 which is not secured to edge 48, as shown in FIG. 1, so that the straight portion of the member may be easily secured to the skirt without making a complicated stitch to secure them together.

U-shaped rigid member 56 includes left and right hanging members or arms 60, 60' which extend parallel to one another and orthogonally from the plane formed by U-shaped member 56. Arms 60, 60' have eyelets, like eyelet 62 in arm 60, at their terminal ends for receiving rope 14 therethrough. When in an operative suspended position, as shown in FIG. 1, rope 14 passes through bore 58 and each end of the rope is preferably passed twice through its associated eyelet, like eyelet 62, and attached to a support, such as branch 12. Passing the rope twice through an eyelet confers the advantage of preventing slippage of the rope within the eyelet, thus making the suspended bag more stable in high winds or other such disturbance.

FIGS. 2 and 3 show, from an elevated side view, the upper portion of bag 10 in a closed and opened position, respectively. In a first or opened position as shown in FIG. 3, U-shaped member 56 and support member 54 are held horizontal due to tension on arms 60, 60' provided by rope 14. Since the rope tension (shown by the arrow) pulls arms 60, 60' vertically, orthogonal support and U-shaped members 54, 56 are held horizontally, thus separating opening edges 48, 50 to present a funnel like opening 46 into the interior of inner sack 16.

When U-shaped member 56 is rotated 270 degrees to a second or closed position, as illustrated in FIG. 2, the back edge 50 of skirt upper opening 46 is folded over the front edge 48 to close the opening, thereby preventing rain or foreign matter from seeping through the upper opening of the bag. Again, the upward tension provided by rope 14 to arms 60, 60' (shown by the arrow) holds the opening closed by pressing the U-shaped member 56 and secured back edge 50 against the front panel 34 of skirt 30. It will remain closed until one pulls member 56 to the left and upwardly, thereby rotating the closure means 52 a full 270 degrees to its opened position.

FIG. 4 shows a second embodiment of the invention having a flap-like opening defined in two dimensions. It is understood that the portion of the bag which is not shown is identical to that previously described and shown in FIG. 1. The inner porous storing and dusting sack is not shown and the flap-like opening, shown folded partially downward in FIG. 4, is understood to define an opening (described further below) which is aligned with the inner sack opening. For the sake of clarity, only the outer skirt is shown and described.

Outer skirt 64 is generally waterproof and can be made with identical materials as skirt 30 described above. From upper end 66, the skirt side walls 68, 70 flare outwardly and downwardly. Skirt 64 further has an upper opening 72 which is defined by opposing front and back edges 74, 76 extending in two dimensions along a substantial length of upper end 66 and along a portion of side walls 68, 70. Though shown in FIG. 4 as a three-sided opening, it is well understood that the opening can be two-sided along the upper end 66 and only one side wall.

Closure means, shown generally at 78, are secured to the opening edges 74, 76 and preferably include hook and loop material 80, 82 (marketed as VELCRO) sewn in opposition to one another. In use, the front upper portion of the bag, shown by flap 84, is pulled downwardly, thereby unfastening the hook and loop material and exposing upper opening 72 as shown in FIG. 4. The bag may then be easily filed. After filing, opening 72 may be closed by folding flap 64 upward, thereby engaging the hook and loop material along opposing front and back edges 74, 76 of the opening to secure the edges in water tight abutment.

Defining the front and back edges 74, 76 of opening 72 in two dimensions provides additional advantages. The horizontal component of opening 72 (along upper end 66) allows for easy filling of the bag from above. Providing only a horizontal opening, however, has a distinct disadvantage. The weight of the bag when filed causes closure means defined along horizontal opening edges (such as end 66) to open. By adding a vertical component to the opening, such as along a portion of flared sides 68, 70, the closure means can be maintained in a more secured position even when the bag is completely filled. Thus, the bag affords the ease of use advantage of top-filed bags with the secured closure of side-filled dusting bags.

For added structure, a rigid support member 86 such as a metal rod is sewn along the upper end 66 of the back panel of the skirt. In this fashion, upper end 66 will not deform when material is added to the bag. Additionally, flap 66 on the skirt's front panel can be folded downwardly thereby exposing opening 72. Support member 86 further includes arms 88, 90 extending orthogonally from the terminal ends of member 86 and ending in eyelets. A rope 92 can then be received through the eyelets at the ends of arms 88, 90 and the bag consequently suspended from a support.

Having described and illustrated the principles of the invention in a preferred embodiment thereof, it should be apparent that the invention can be modified in arrangement and detail without departing from such principles. We claim all modifications and variation coming within the spirit and scope of the following claims.

What is claimed is:

1. A self-dusting livestock powdered insecticide applicator comprising:

an inner porous storing and dusting sack having front and back portions and side walls flaring outward and downward to a lower end, said inner sack having a horizontal opening at an upper end defined by opposing front and back edges for filling the sack;

an outer skirt made of waterproof material secured to the inner sack, said outer skirt extending over the inner sack to an outer skirt lower end located below the inner sack lower end thereby exposing the inner sack from below for adequate dispersal of material directly under the inner sack while preventing rain and foreign matter from touching the inner sack; and closure means fixed to the outer skirt adjacent the upper end of the inner sack, wherein the closure means includes hook and loop fasteners fixed adjacent the opposing edges of the opening, said closure means extending in two dimensions.

2. The applicator of claim 1 wherein the outer skirt is secured to the inner sack adjacent the upper end and side walls of the inner sack, said outer skirt further including front and back panels extending over front and back portions of the inner sack respectively, said front and back panels being secured to each other along a substantial length of the flared side walls of the inner sack.

3. The applicator of claim 2, further including:

an elongate rigid support member secured along the back edge of the opening and terminating in left and right eyelets; and hanging means secured to the eyelets.

4. A self-dusting livestock powdered insecticide applicator comprising:

an inner porous storing and dusting sack having front and back portions and side walls flaring outward and downward to a lower end, said inner sack having a horizontal opening at an upper end defined by opposing front and back edges for filling the sack;

an outer skirt made of waterproof material secured to the inner sack, said outer skirt extending over the inner sack to an outer skirt lower end located below the inner sack lower end thereby exposing the inner sack from below for adequate dispersal of material directly under the inner sack while preventing rain and foreign matter from touching the inner sack; and closure means fixed to the outer skirt adjacent the upper end of the inner sack, wherein the closure means includes an elongate rigid support member secured along the back edge of the opening and a U-shaped rigid member attached to both terminal ends of the support member and secured to the front edge of the opening, said U-shaped member having cantilever means which in a first position separates the front and back edges of the opening, and in a second position folds the back edge of the opening over the front edge to close the opening.

5. The applicator of claim 4 wherein the cantilever means includes left and right hanging members extending orthogonally from the U-shaped member, each hanging member having eyelets at a terminal end for receiving rope therethrough so that tension imparted to the hanging members when the applicator is hung causes the hanging members to extend vertically upward and the orthogonally attached U-shape member to extend horizontally outward, thereby separating the front and back edges of the opening for easy filling.

6. The applicator of claim 4 wherein the elongate rigid support member is substantially contained in the plane of the U-shaped member.

7. The applicator of claim 6 wherein the elongate rigid support member includes an axial bore for receiving a rope therethrough.

8. The applicator of claim 4 wherein the outer skirt includes front and back panels extending over front and back portions of the inner sack respectively, said front and back panels being secured to each other along a substantial length of the flared side walls of the inner sack, said substantial length not including a free portion adjacent the upper end of the sack.

9. A dusting bag for dispensing powdered insecticide upon contact with the bag comprising:

an inner porous storing and dusting sack, said inner sack having a closed lower end and an opening defined by opposing front and back edges along an upper end and at least one side portion of the sack;

an outer skirt made of a flexible water proof material secured to the outside of the inner sack and extending below the lower end of the sack, said outer skirt having an upper opening aligned with the inner sack opening and defined by opposing front and back edges secured to corresponding front and back opening edges of the inner sack, said outer skirt further having a lower opening exposing the lower end of the sack from the underside; and closure means secured adjacent the opening edges of the outer skirt along a substantial length of the upper opening for securing together opposing opening edges in water tight abutment.

10. The dusting bag of claim 9 further including two eyelets secured to the upper portion of the outer skirt for hanging the bag.

11. The dusting bag of claim 10 wherein the inner sack has left and right flared side walls extending outward and downward from the upper end of the sack to the lower end, thus forming a substantially trapezoidal shaped container.

12. The dusting bag of claim 11 wherein the front and back openings of the inner sack are defined along the upper end and at least a portion of the left and right side walls adjacent the upper end, thereby making a three-sided opening.

13. The dusting bag of claim 12 wherein the closure means includes hook and loop material secured to the opposing front and back edges of the opening.

14. A dusting bag for dispensing powdered insecticide upon contact with the bag comprising:

- an inner porous storing and dusting sack, said inner sack having a closed lower end and an opening defined by opposing front and back edges along an upper end of the sack;
- an outer skirt made of a flexible water proof material secured to the outside of the inner sack and extending below the lower end of the sack, said outer skirt having an upper opening defined by opposing front and back edges aligned with front and back openings of the inner sack opening, said outer skirt further having a lower opening exposing the lower end of the sack from the underside; and
- closure means secured to the outer skirt adjacent the opening edges along a substantial length of the opening, said closure means including an elongate rigid support member secured along the front edge of the outer skirt opening and a U-shaped rigid member attached to both terminal ends of the support member and secured to the back edge of the outer skirt opening, said U-shaped member having cantilever means which in a first position separates the front and back edges of the outer skirt opening, and in a second position folds the back edge of the opening over the front edge to close the opening.

15. The applicator of claim 14 wherein the cantilever means includes left and right hanging members extending orthogonally from the U-shaped member, each hanging member having eyelets at a terminal end for receiving rope therethrough so that tension imparted to the hanging members when the applicator is hung causes the hanging members to extend vertically upward and the orthogonally attached U-shape member to extend horizontally outward, thereby separating the front and back edges of the outer skirt opening for easy filling.

16. The applicator of claim 14 wherein the elongate rigid support member is substantially contained in the plane of the U-shaped member.

17. The applicator of claim 16 wherein the elongate rigid support member includes an axial bore for receiving a rope therethrough.

18. The applicator of claim 14 wherein the outer skirt includes front and back panels extending over front and back portions of the inner sack respectively, said front and back panels being secured to each other along a substantial length of the flared side walls of the inner sack, said substantial length not including a free portion adjacent the upper end of the sack.

19. A dusting bag applicator comprising:

- a dusting bag having a closed lower end and an opening defined by opposing front and back edges along an upper end of the bag, the applicator comprising:
- an elongate rigid support member secured along the front edge of the bag opening, said support member including an axial bore;
- a U-shaped member attached to both terminal ends of the support member and secured to the back edge of the bag opening;
- cantilever means which in a first position separates the front and back edges of the bag opening, and in a second position folds the back edge of the opening over the front edge to close the opening, said cantilever means including left and right arms extending substantially orthogonally out of the plane of the U-shaped rigid member and terminating in eyelets; and
- a rope received through the axial bore of the elongate support member, said rope further being received twice through each of the left and right eyelets and attached to a support when said applicator is in operative condition, thereby suspending the applicator above the ground.

* * * * *